(12) United States Patent
Tanaka et al.

(10) Patent No.: US 6,671,509 B1
(45) Date of Patent: Dec. 30, 2003

(54) MOBILE COMMUNICATION UNIT AND MOBILE COMMUNICATION SYSTEM

(75) Inventors: Masaki Tanaka, Inagi (JP); Kenzo Urabe, Sendai (JP); Seigo Miyoshi, Sendai (JP); Yoshikuni Itoh, Sendai (JP); Hideto Yamaguchi, Unazuki (JP)

(73) Assignee: Kokusai Electric Co., Ltd., Tokyo (JP)

( * ) Notice: Subject to any disclaimer, the term of this patent is extended or adjusted under 35 U.S.C. 154(b) by 0 days.

(21) Appl. No.: 09/339,835

(22) Filed: Jun. 25, 1999

(30) Foreign Application Priority Data

Jun. 26, 1998 (JP) .......................... 10-196658

(51) Int. Cl.$^7$ ................................ H04Q 7/32
(52) U.S. Cl. .................. 455/419; 455/186.1; 455/550.1
(58) Field of Search ................... 455/418, 419, 455/186.1, 550, 551, 552, 566, 561; 370/338, 401

(56) References Cited

U.S. PATENT DOCUMENTS

| | | | |
|---|---|---|---|
| 5,109,403 A | | 4/1992 | Sutphin |
| 5,182,553 A | * | 1/1993 | Kung .......................... 455/419 |
| 5,761,618 A | * | 6/1998 | Lynch et al. ................ 455/419 |
| 5,790,952 A | * | 8/1998 | Seazholtz et al. ........... 455/419 |
| 5,794,141 A | * | 8/1998 | Zicker ......................... 455/418 |
| 5,930,704 A | * | 7/1999 | Kay ............................ 455/419 |
| 5,995,829 A | * | 11/1999 | Broderick ................... 455/418 |
| 6,031,830 A | * | 2/2000 | Cowan ........................ 370/338 |
| 6,052,600 A | * | 4/2000 | Fette et al. .................. 455/419 |
| 6,195,546 B1 | * | 2/2001 | Leung et al. ................ 455/419 |
| 6,349,203 B1 | * | 2/2002 | Asaoka et al. .............. 455/418 |

FOREIGN PATENT DOCUMENTS

| | | |
|---|---|---|
| EP | 0 804 046 | 10/1997 |
| EP | 0 825 791 | 2/1998 |
| EP | 0 877 531 | 11/1998 |
| WO | 95/23487 | 8/1995 |
| WO | 97/16938 | 5/1997 |
| WO | 98/53619 | 11/1998 |
| WO | 99/22541 | 5/1999 |

OTHER PUBLICATIONS

IEEE Communications Magazine, May 1995, vol. 33, No. 5.

* cited by examiner

*Primary Examiner*—Lester G. Kincaid
(74) *Attorney, Agent, or Firm*—Wenderoth, Lind & Ponack L.L.P.

(57) ABSTRACT

A mobile station (mobile communication unit) receives system software from a base station via an antenna and a transmitter/receiver, and stores the received system software in a memory. A digital signal processor in the mobile station then performs communication processing according to the system software stored in the memory. By transmitting various system software from the base station, the single mobile station can easily be adapted to different communication principles. The base station also receives system software from a center via a public exchange network, and stores the received system software in a memory. A digital signal processor in the base station then performs communication processing according to the system software stored in the memory.

19 Claims, 10 Drawing Sheets

BASE STATION

MOBILE STATION

BASE STATION

MOBILE STATION

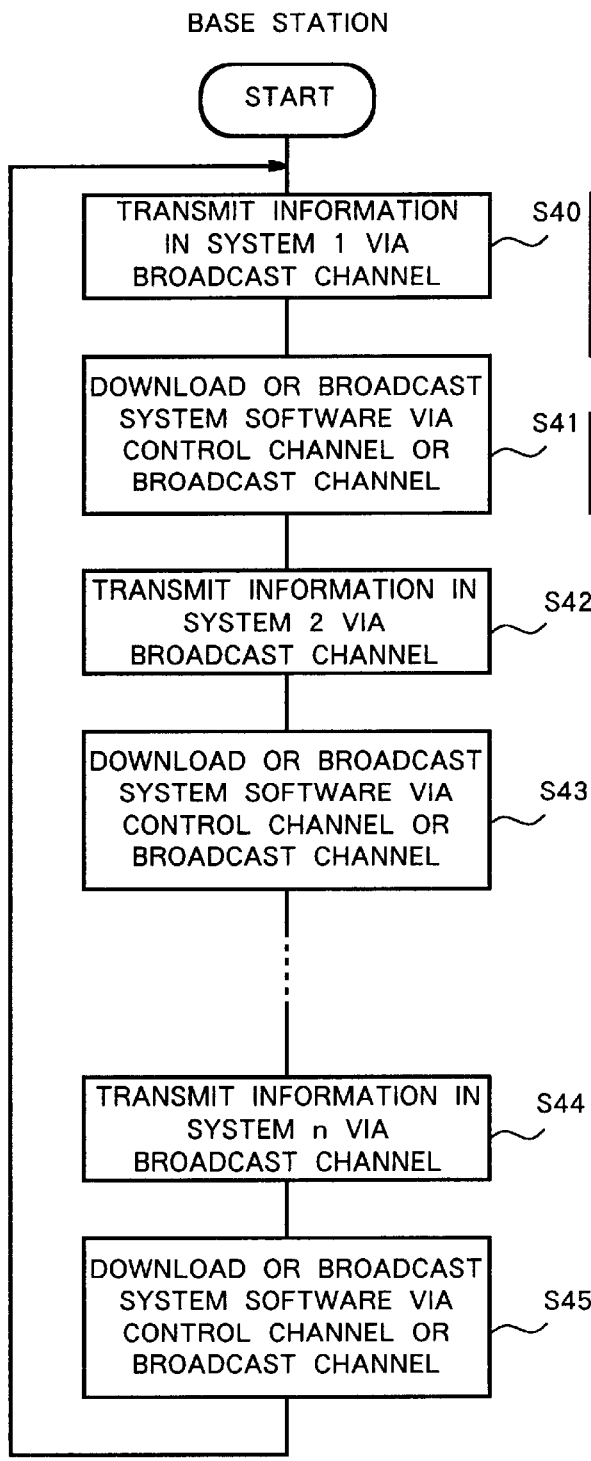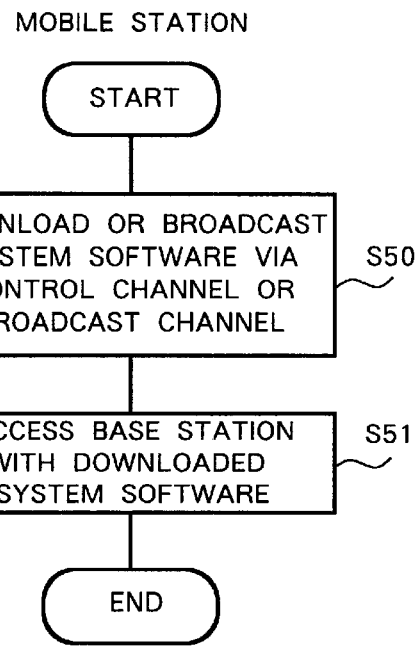
FIG. 4 (a) BASE STATION
FIG. 4 (b) MOBILE STATION

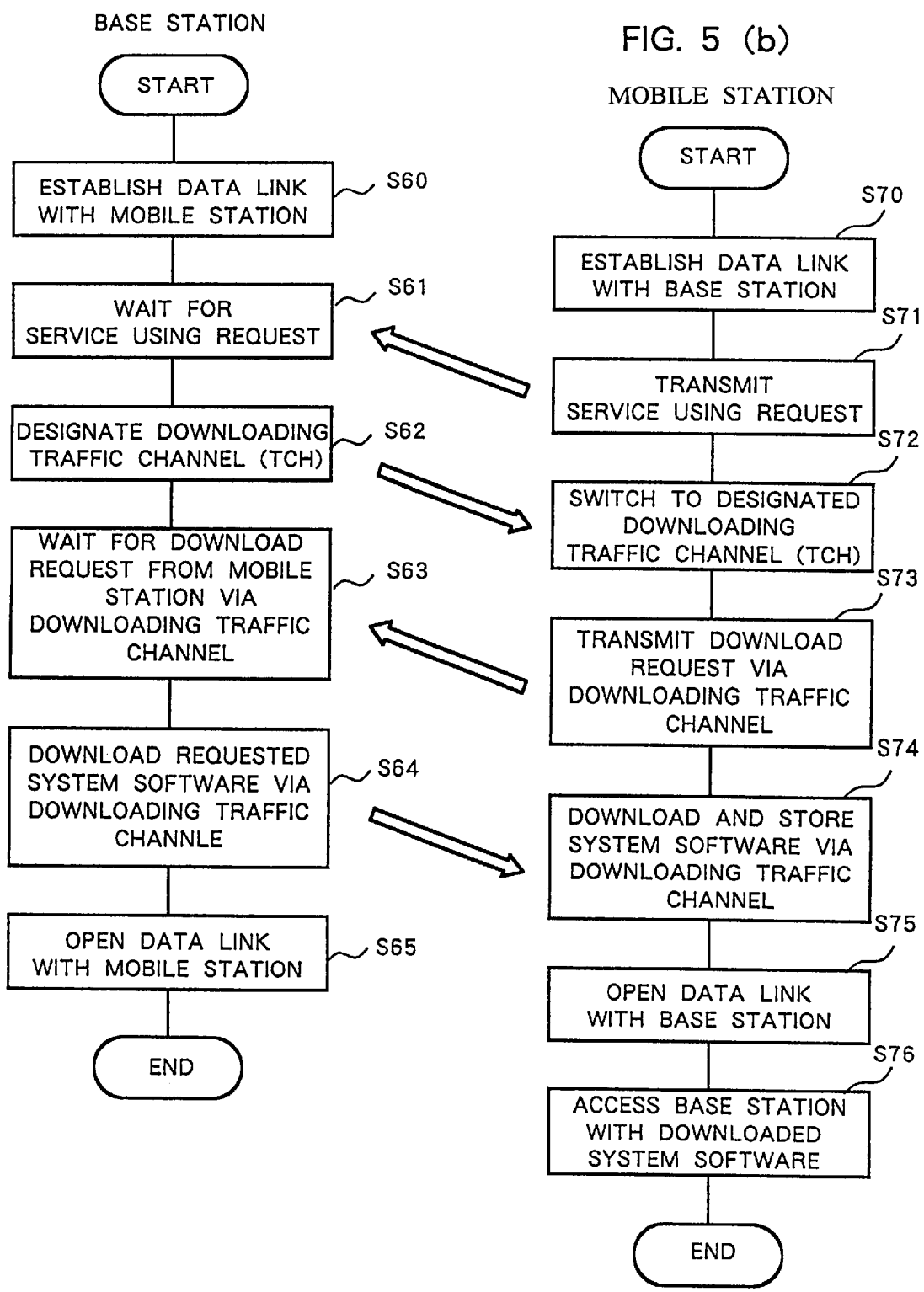

FIG. 8

| BIT 8 | 7 | 6 | 5 | 4 | 3 | 2 | 1 | MESSAGE TYPE |
|---|---|---|---|---|---|---|---|---|
| 0 | 0 | 0 | — | — | — | — | — | : MESSAGE REGARDING START OF COMMUNICATIONS |
|   |   |   | 0 | 0 | 0 | 0 | 1 | : OUTGOING RADIO STATUS REPORT |
|   |   |   | 0 | 0 | 0 | 1 | 0 | : PAGING |
|   |   |   | 0 | 0 | 0 | 1 | 1 | : INCOMING RADIO STATUS REPORT |
| 0 | 0 | 1 | — | — | — | — | — | : MESSAGE REGARDING RELEASE OF COMMUNICATIONS |
|   |   |   | 0 | 0 | 0 | 0 | 1 | : MOBILE STATION RELEASE |
| 0 | 1 | 0 | — | — | — | — | — | : MESSAGE REGARDING CHANNEL SETUP |
|   |   |   | 0 | 0 | 0 | 0 | 1 | : LEVEL MEASUREMENT REQUEST |
|   |   |   | 0 | 0 | 0 | 1 | 0 | : LEVEL MEASUREMENT RESPONSE |
|   |   |   | 0 | 0 | 0 | 1 | 1 | : RADIO CHANNEL DESIGNATION |
| 0 | 1 | 1 | — | — | — | — | — | : MESSAGE REGARDING SETTING UP OF CHANNEL |
|   |   |   | 0 | 0 | 0 | 0 | 1 | : SWITCHED – TO RADIO CHANNEL DESIGNATION |
|   |   |   | 0 | 0 | 0 | 1 | 0 | : SYSTEM INFORMATION |
|   |   |   | 0 | 0 | 0 | 1 | 1 | : SYSTEM INFORMATION CONFIMRATION |
|   |   |   | 0 | 0 | 1 | 0 | 0 | : RADIO STATUS ENQUIRY |
|   |   |   | 0 | 0 | 1 | 0 | 1 | : RADIO STATUS REPORT 1 |
|   |   |   | 0 | 0 | 1 | 1 | 0 | : RADIO STATUS REPORT 2 |
|   |   |   | 0 | 0 | 1 | 1 | 1 | : RADIO STATUS REPORT CONFIRMATION |
|   |   |   | 0 | 1 | 0 | 0 | 0 | : RADIO STATUS REPORT INFORMATION |
|   |   |   | 0 | 1 | 0 | 0 | 1 | : RADIO STATUS REPORT INFORMATION CONFIRMATION |
|   |   |   | 0 | 1 | 0 | 1 | 0 | : REPORT CONDITION NOTICE |
|   |   |   | 0 | 1 | 0 | 1 | 1 | : REPORT CONDITION CONFIRMATION |
|   |   |   | 0 | 1 | 1 | 0 | 0 | : VOX CONTROL REQUEST |
|   |   |   | 0 | 1 | 1 | 0 | 1 | : VOX CONTROL RESPONSE |
| 1 | 0 | 0 | — | — | — | — | — | : MESSAGE REGARDING CHANNEL RELEASE |
|   |   |   | 0 | 0 | 0 | 0 | 1 | : RADIO CHANNEL DISCONNECTION |
|   |   |   | 0 | 0 | 0 | 1 | 0 | : RADIO CHANNEL DISCONNECTION CONFIRMATION |
| 1 | 0 | 1 | — | — | — | — | — | : OTHER MESSAGE |
|   |   |   | 0 | 0 | 0 | 0 | 1 | : BROADCAST INFORMATION |

FIG. 9

ADDED MESSAGE FUNCTIONS

| BIT | | | | | | | | MESSAGE TYPE |
|---|---|---|---|---|---|---|---|---|
| 8 | 7 | 6 | 5 | 4 | 3 | 2 | 1 | |
| 1 | 1 | 0 | – | – | – | – | – | : MESSAGE REGARDING SYSTEM SOFTWARE DOWNLOAD |
| | | | 0 | 0 | 0 | 0 | 1 | : TRANSMISSION OF SERVING USING REQUEST |
| | | | 0 | 0 | 0 | 1 | 0 | : TRANSMISSION OF AVAILABLE SERVICE MENU |
| | | | 0 | 0 | 0 | 1 | 1 | : DOWNLOAD REQUEST |
| | | | 0 | 0 | 1 | 0 | 0 | : DOWNLOAD |

FIG. 10

| BIT | | | | | | | | MESSAGE TYPE |
|---|---|---|---|---|---|---|---|---|
| 8 | 7 | 6 | 5 | 4 | 3 | 2 | 1 | |
| 1 | 1 | 0 | – | – | – | – | – | : MESSAGE REGARDING SYSTEM SOFTWARE DOWNLOAD |
| | | | 0 | 0 | 0 | 0 | 1 | : TRANSMISSION OF SERVING USING REQUEST |
| | | | 0 | 0 | 0 | 1 | 0 | : DOWNLOAD CHANNEL DESIGNATION |

MOBILE COMMUNICATION UNIT AND MOBILE COMMUNICATION SYSTEM

BACKGROUND OF THE INVENTION

1. Field of the Invention

The present invention relates to a mobile communication system for use as a cellular system, a cordless telephone system, or a wireless LAN system, and more particularly to a technology for sharing hardware resources to meet different communication principles.

2. Description of the Related Art

Mobile communication systems offer various different communication services including a PHS (personal handyphone system), a PDC (personal digital cellular) system, a paging system, etc. It is expected that new services such as a high-speed wireless LAN system will be introduced into the market.

In mobile communication systems, information is transmitted via radio links between a base station and mobile stations, i.e., mobile communication units such as portable communication terminals. The conventional mobile communication systems need to provide a base station and mobile stations for each type of service which the mobile communication systems offer. This is because a dedicated set of hardware is required to realize to achieve a communication system for a certain communication service.

To receive a plurality of communication services, the user needs to own a plurality of different mobile stations, i.e., mobile communication units, corresponding to the respective communication services. However, owning many mobile stations is costly and makes the user feel awkward in selecting and using them. If the user wants to use a mobile station to receive a communication service overseas, then the user has to use a dedicated mobile station because the communication system which offers such a communication service overseas is different from available domestic communication systems. Therefore, the present mobile communication technology has presented an obstacle to a goal of achieving internationally accessible communication services.

Base stations that are available at present cannot handle new communication services which will be introduced because installation sites available are limited and the cost of installation is prohibitively high.

Japanese laid-open patent publication No. 7-222227 discloses a mobile communication unit which has both a device having a TDMA communication means and a device having a CDMA communication means. These different communication means are selected one at a time to enable the mobile communication unit to handle different communication schemes.

The disclosed mobile communication unit incorporates a plurality of hardware circuits based on different communication principles, or stated otherwise it is a combination of different mobile communication units. As a result, the mobile communication unit tends to be large in size and expensive, and fails to essentially solve the above problems.

According to the invention disclosed in Japanese laid-open patent publication No. 9-64601, some of a plurality of circuit elements of a high-frequency circuit in a radio communication unit are shared for all frequencies, and other circuit elements are connected to those same circuit elements depending on frequencies to be used, so that the single high-frequency circuit is capable of handling a plurality of frequencies.

Since the high-frequency circuit has the shared circuit elements and the circuit elements associated with the respective frequencies, the high-frequency circuit is liable to be large in size and expensive, and does not offer an essential solution to the above problems.

Heretofore, as described above, attempts to make one mobile communication unit adaptable to various different communication principles have necessarily resulted in an increase in size and cost, and devices or circuits based on those different communication principles need to be assembled in the mobile communication unit when it is manufactured.

SUMMARY OF THE INVENTION

It is therefore an object of the present invention to provide a mobile communication unit, a mobile communication system, a method of changing communication principles in a mobile communication system, and a base station which are capable of handling various different communication principles without involving increased unit size and cost.

In a mobile communication system for transmitting information between a base station and a mobile communication unit via a radio link, the base station transmits system software to the mobile communication unit via the radio link, and the mobile communication unit performs communication processing according to the received system software. Therefore, the same hardware resources are shared, but the communication principles of the mobile communication unit are changed by the system software. Specifically, using the hardware resources of the mobile communication unit as a platform, various system software downloaded from the base station into the platform is executed to adapt the single communication unit to various communication principles according to the system software. The system software is supplied from a center of communication services via a public exchange network to the base station, and then supplied from the base station to the mobile station present in the service area of the base station.

To change the communication principles of the mobile communication system, a radio communication means in the mobile communication unit receives a control program (system software) representing details of the communication processing from the base station via the radio link, and stores the received control program in a memory such as a RAM or the like. A control means comprising a CPU, a DSP, etc. then performs communication processing according to the control program stored in the memory.

Therefore, simply by transmitting various control programs from the base station via a radio link, it is possible to adapt the single mobile communication unit easily to various communication principles. The communication principles can be changed when required after the mobile communication unit has been manufactured.

If primary concern is given over user's convenience for receiving various communication services, then it is preferable to supply various control programs from the base station via a radio link. The principles of the present invention are also applicable to providing new communication services at stores in view of user's needs. In such a case, control programs may be supplied from a dedicated transmitter to the mobile communication unit via a radio link.

To change communication principles of the mobile communication system, a communication interface means of the base station receives system software from a center through a public exchange network, and a radio communication means of the base station transmits the system software received by the communication interface means via a radio link. In the mobile communication unit, a radio communication means receives system software from the base station via a radio link, a memory stores the control program received by the radio communication means, and a control means performs communication processing according to the control program stored in the memory.

Therefore, simply by transmitting various system software from the base station via a radio link, the mobile communication unit present in the service area of the base station can easily be adapted to various communication principles.

More specifically, when the mobile communication unit receives a control input of the user from an input means such as control buttons, a download requesting means transmits a download request for system software designated by the control input from the radio communication means via a radio link. In the base station, a system software supply means transmits system software according to the download request from the radio communication means via a radio link.

Therefore, the user can control the mobile communication unit to change communication processing of the mobile communication unit to desired details.

For making the user's designating operation more convenient, the mobile communication unit comprises a menu requesting means for transmitting a menu request based on a control input from the user from the radio communication means via a radio link, and the base station comprises a menu providing means for transmitting a menu of system software that can be supplied in response to the menu request from the radio communication means via a radio link. The mobile communication unit further comprises output means for displaying the menu of system software received by the radio communication means, for the user to designate system software to be downloaded.

The radio communications relative to system software can be performed by effectively utilizing the traffic channel already provided for radio communications between the base station and the mobile communication unit. For example, a bidirectional control channel, together with a traffic channel for transferring user information, may be used between the base station and the mobile communication unit for transmitting the menu request, the menu, and the download request, and the system software via a radio link.

The radio communications relative to system software can be performed in another mode. The base station further comprises a system software supply means for successively and repeatedly transmitting a plurality of system software items from the radio communication means via a radio link, and the mobile communication unit further comprises an input means for receiving a control input from the user, and a memory control means for controlling the memory to store system software designated by the control input among the system software items received by the radio communication means, whereby communication processing can be performed by the system software designated by the user of the mobile communication unit.

When the user of the mobile communication unit selects one of the system software items that are successively transmitted from the base station, the user can easily change the communication processing of the mobile communication unit to desired details.

The radio communications relative to system software can be performed by effectively utilizing the traffic channel already provided for radio communications between the base station and the mobile communication unit. For example, a unidirectional broadcast channel from the base station to the mobile communication unit, together with a traffic channel for transferring user information, may be used for transmitting the system software via a radio link.

In a system for performing radio communications between the base station and the mobile communication unit using a traffic channel for transferring user information and a control channel provided together with the traffic channel, the radio communications relative to system software can be performed in the following mode:

In the mobile communication unit, an input means receives a control input from the user, and a change requesting means transmits a request to change system software designated by the control input from the radio communication means via a radio link using the control channel. In the base station, a channel selecting means selects and designates the traffic channel for transferring user information to transmit system software based on the request to change system software received by the radio communication means, a channel designating means transmits designating information of the traffic channel designated by the channel selecting means, from the radio communication means via a radio link using the control channel, and a system software supply means transmits system software changed in response to the request to change system software, from the radio communication means via a radio link using the traffic channel designated by the transmitted designating information. In the mobile communication unit, a memory control means controls the memory to store system software received by the radio communication means using the traffic channel designated by the designating information received by the radio communication means.

Alternatively, a system may not be designated by a changing request from the mobile communication unit, and the base station may cyclically transmit a plurality of system software items using a traffic channel designated thereby. In the mobile communication unit, system software designated by the input means among the system software received by the radio communication means using the traffic channel according to the designating information may be stored in the memory.

Since system software is transmitted via the traffic channel whose capacity is generally larger than the control channel, a considerably large system change can be made without undue efforts.

If the base station can be adapted to communication systems of different principles in the mode for transmitting system software using the broadcast and control channels, then broadcast and control channels corresponding to a plurality of communication systems of different principles are provided in a time-division multiplexed fashion between the base station and the mobile communication unit, and system software is transmitted from the base station to one of the mobile communication units via the broadcast and control channels which correspond to the one of the mobile communication units.

The present invention is also applied to a base station used in a mobile communication system. The base station receives a control program (system software) from a system management center or the like via a public exchange network, and the received control program is stored in a memory such as a RAM or the like. A control means comprising a CPU, a DSP, etc. performs communication processing according to the control program stored in the memory. By thus performing communication processing according to the control program received by the base station, the principles of radio communications between the base station and the mobile communication unit are changed according to the control program while sharing the same hardware resources.

Consequently, simply by transmitting various control programs via the public exchange network, it is possible to adapt the single base station easily to various communication principles. The communication principles can be changed when required after the base station has been manufactured and installed. Thus, the communication principles of a large number of installed base stations can easily be changed.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIGS. 4(a) and 4(b) are flowcharts of a communication processing sequence for supplying system software from the base station to the mobile station based on a time-division multiplex transmission scheme using a broadcast channel in a particular system and a control channel or broadcast channel in the particular system;

FIGS. 5(a) and 5(b) are flowcharts of a communication processing sequence for supplying system software from the base station to the mobile station using a bidirectional control channel and a bidirectional traffic channel for transferring user information;

FIG. 8 is a diagram illustrating messages that can be transferred by a radio-frequency transmission management routine;

FIG. 9 is a diagram illustrating messages that can be transferred by the radio-frequency transmission management routine;

FIG. 10 is a diagram illustrating messages that can be transferred by the radio-frequency transmission management routine.

DETAILED DESCRIPTION OF THE PREFERRED EMBODIMENT

Figure 1:
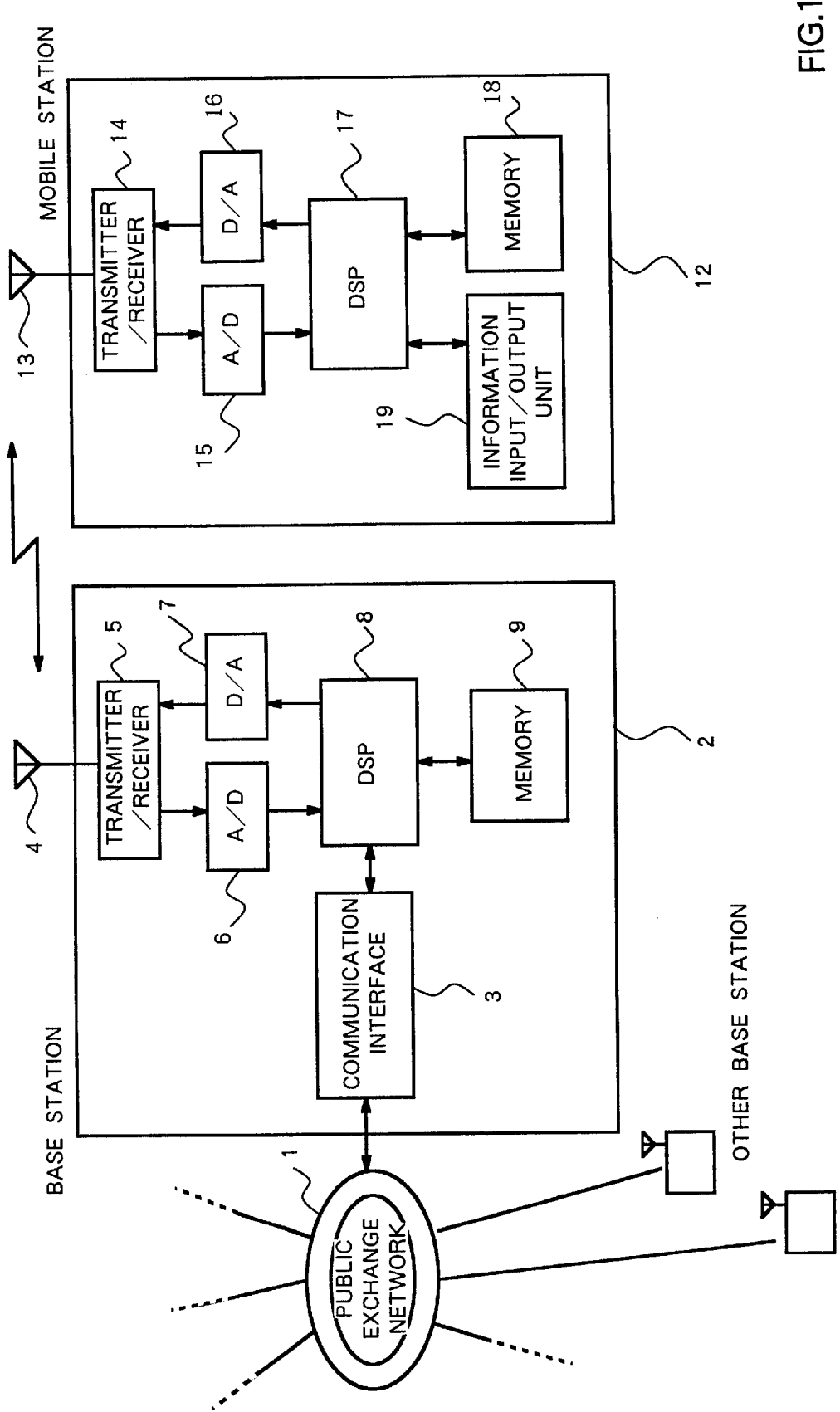
FIG. 1 is a block diagram of a mobile communication system according to the present invention.

FIG. 1 shows in block form a mobile communication system according to the present invention.

As shown in FIG. 1, the mobile communication system generally comprises a base station 2 connected to a public exchange network 1 and a mobile station (mobile communication unit) 12 connected via a radio link to the base station 2. The base station 2 communicates with other base stations and a center (not shown) which manages system software via the public exchange network 1 under the control of an exchange (not shown). The base station 2 communicates with the mobile station 12 via radio channels. While only the single mobile station 12 is shown as being connected to the base station 2 in FIG. 1, the base station 2 is capable of accommodating a plurality of mobile stations present in a service area covered thereby.

The base station 2 comprises a communication interface 3 connected to the public exchange network 1, a transmission/reception antenna 4 for transmitting and receiving information as radio signals, a transmitter/receiver 5 for modulating radio information signals to be transmitted and demodulating radio information signals that have been received, an A/D converter 6 for converting received radio information signals into a digital value, a D/A converter 7 for converting radio information signals to be transmitted into an analog value, a digital signal processor (DSP) 8 for controlling the communication interface 3, the transmitter/receiver 5, and other functions and performing predetermined communication processes, and a memory 9 such as a RAM for storing system software and other data. The DSP 8 executes the system software (control program) stored in the memory 9 to control the functions and perform the communication processes.

The mobile station 12 comprises a transmission/reception antenna 13 for transmitting and receiving information as radio signals, a transmitter/receiver 14 for modulating radio information signals to be transmitted and demodulating radio information signals that have been received, an A/D converter 15 for converting received radio information signals into a digital value, a D/A converter 16 for converting radio information signals to be transmitted into an analog value, a digital signal processor (DSP) 17 for controlling the transmitter/receiver 14 and other functions and performing predetermined communication processes, a memory 18 such as a RAM for storing system software and other data, and an information input/output unit 19 including control buttons for entering inputs from the user and an LCD or similar display unit for displaying information for the user. The DSP 17 executes the system software (control program) stored in the memory 18 to control the functions and perform the communication processes.

In the base station 2, the communication interface 3 receives system software transmitted from the center via the public exchange network 1 and downloads the received system software into the memory 9. The DSP 8 executes the system software stored in the memory 9 to perform communication processes corresponding to a plurality of communication services. The base station 2 transmits the system software to the mobile station 12 via a radio link. Therefore, simply by transmitting various control programs via the public exchange network 1 to the base station 2, it is possible to adapt the base station 2 to various communication principles.

When the user of the mobile station 12 enters an input for a desired communication service via the information input/output unit 19, the mobile station 12 receives system software corresponding to the desired communication service from the base station 2 and downloads the received system software into the memory 18. Then, the DSP 17 executes the system software stored in the memory 18 to perform a communication process corresponding to the communication service.

Figure 2:
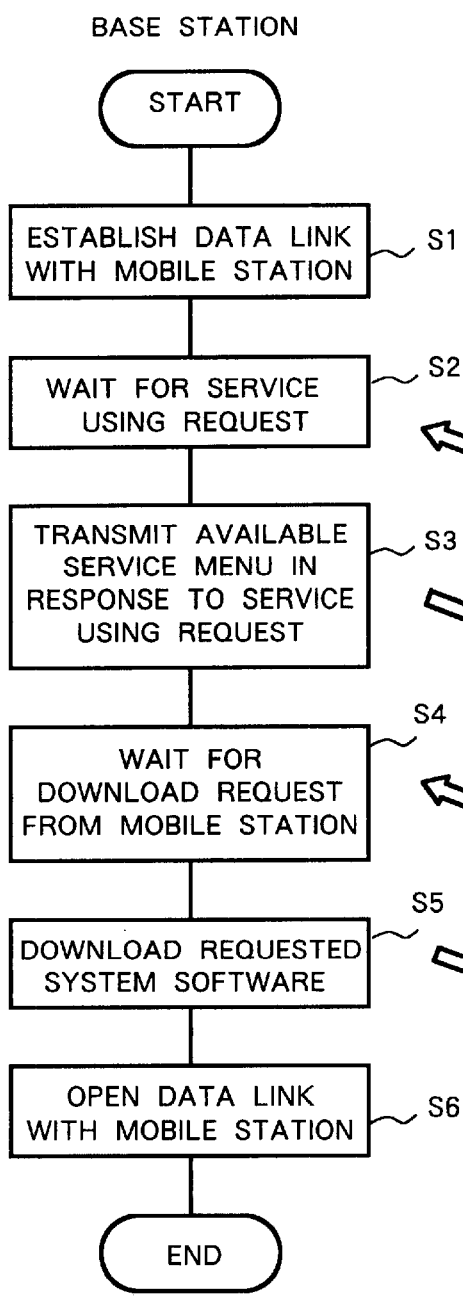
FIGS. 2(a) and 2(b) are flowcharts of a communication processing sequence for supplying system software from a base station to a mobile station using a bidirectional control channel.
Figure 2:
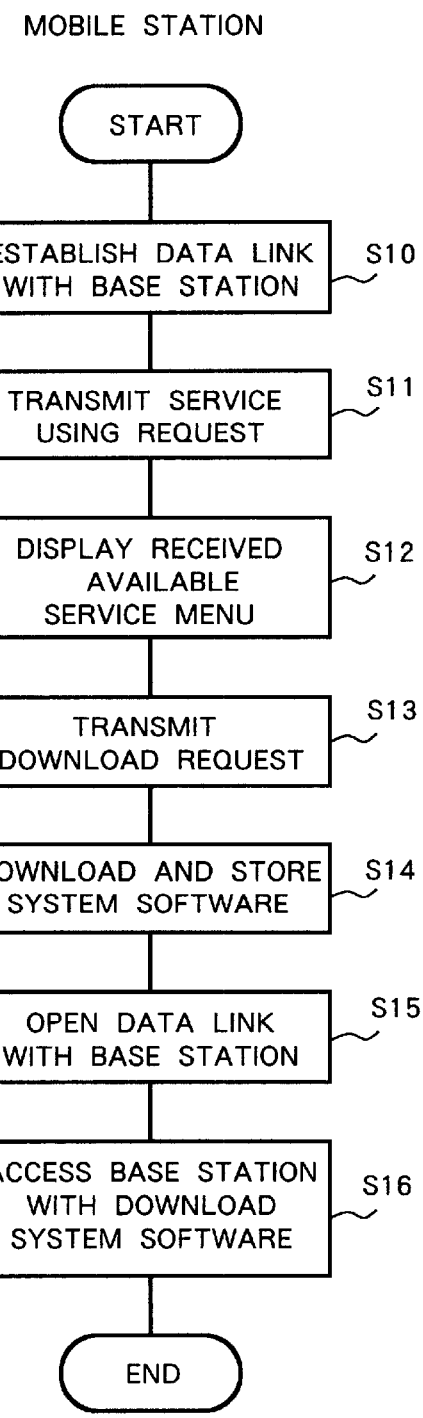

The system software may be supplied from the base station 2 to the mobile station 12 via radio channels between the base station 2 and the mobile station 12 according to one of the following modes:

FIGS. 2(a) and 2(b) show a communication processing sequence for supplying system software using a bidirectional control channel. FIG. 2(a) shows a processing sequence of the base station 2, and FIG. 2(b) shows a processing sequence of the mobile station 12. As described in detail later on, the bidirectional control channel is a channel provided for primarily transferring control information, and is present, together with a traffic channel used to transfer primarily user information such as audio information, video information, etc., between the base station 2 and the mobile station 12. Generally, a control channel is arranged to be able to effect stable communications at a low error rate.

After the base station 2 and the mobile station 12 establish a bidirectional data link using a control channel in steps S1, S10, the base station 2 waits for a service request from the mobile station 12 in step S2. The user operates the information input/output unit 19 to enter a menu request in order to change system software for using a new communication service, and the DSP 17 transmits the menu request via the D/A converter 16 and the transmitter/receiver 14 from the antenna 13 through the data link in step S11. In the base station 2, the transmitter/receiver 5 receives the menu request from the antenna 4, and sends the menu request via the A/D converter 6 to the DSP 8.

In response to the menu request, the DSP 8 transmits an available service menu via the D/A converter 7 and the transmitter/receiver 5 from the antenna 4 through the data link in step S3. Then, the base station 2 waits for a download request from the mobile station 12 in step S4. The available service menu represents a list of services that can be provided by the base station 2 which has received the menu request, and is stored in the memory 9.

When the mobile station 12 receives the available service menu, the DSP 17 displays the received available service menu on the display unit of the information input/output unit 19 in step S12. Then, the user selects a desired one of the services displayed in the available service menu, and enters the selected service through the information input/output unit 19. The DSP 17 transmits a download request for the selected service through the data link in step S3.

In response to the download request, the DSP 8 reads system software designated by the download request from the memory 9, and transmits the system software through the data link to the mobile station 12 in step S5. When the base station 2 receives a download completion notice from the mobile station 12, the base station 2 opens the data link and finishes its operation to supply the system software to the mobile station 12 in step S6.

The mobile station 12 receives the system software transmitted from the base station 2 via the data link, and the DSP 17 stores the system software in the memory 18 in step S14. After having sent the download completion notice to the base station 2, the mobile station 12 opens the data link in step S15. The DSP 17 executes the system software downloaded into the memory 18 to perform a communication process based on the system software and access the base station 2 via radio communications for performing the communication service desired by the user in step S16.

As described above, when the user selects an available service from the available service menu which has been provided, the base station 2 supplies the corresponding system software via the data link to the mobile station 12 which is currently used by the user. The user can thus receive the desired communication service at the mobile station 12.

An ID of the mobile station 12 is added to the menu request and the download request that the mobile station 12 transmits to the base station 2, and an ID of the base station 2 is added to the available service menu and the system software that the base station 2 transmits to the mobile station 12. Accordingly, the information can smoothly be exchanged between the base station 2 and the mobile station 12 based on those IDs.

Figure 3:
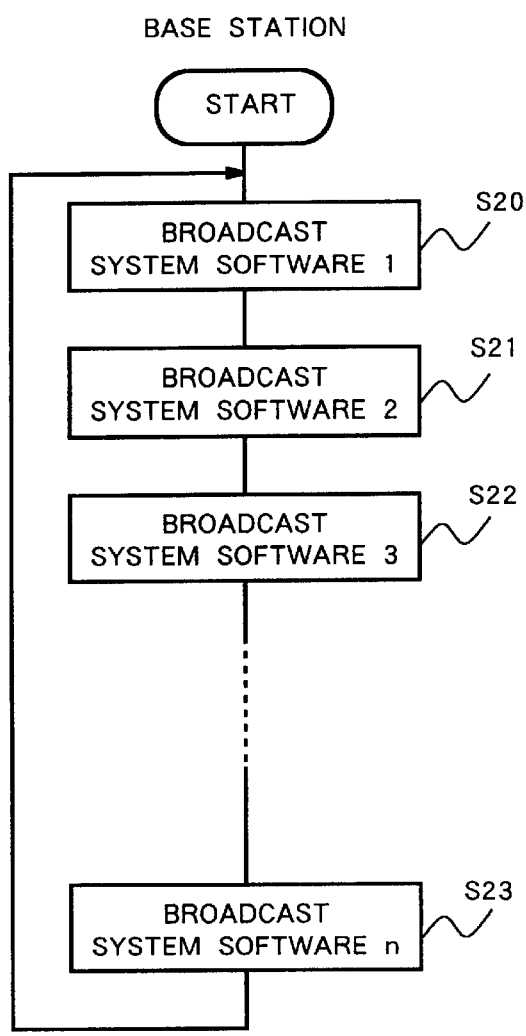
FIGS. 3(a) and 3(b) are flowcharts of a communication processing sequence for supplying system software from the base station to the mobile station using a unidirectional broadcast channel.
Figure 3:
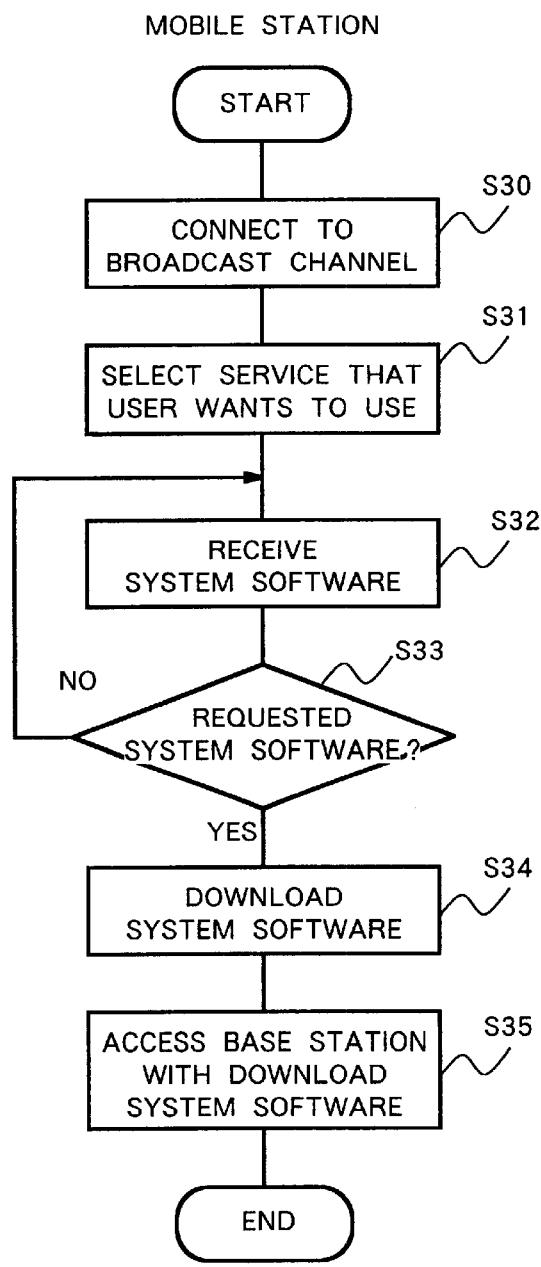

FIGS. 3(a) and 3(b) show a communication processing sequence for supplying system software from the base station 2 to the mobile station 12 using a unidirectional broadcast channel. FIG. 3(a) shows a processing sequence of the base station 2, and FIG. 3(b) shows a processing sequence of the mobile station 12. The unidirectional broadcast channel may be referred to as a control channel in a wide sense, and is present, together with a traffic channel used to transfer primarily user information between the base station 2 and the mobile station 12.

In the base station 2, the DSP 8 cyclically reads a plurality of different system software (system software items 1–n) stored in the memory 9, and successively transmits these system software through the broadcast channel in steps S20–S23.

The mobile station 12 is connected to the broadcast channel in step S30. After the user specifies a desired service via the information input/output unit 19 in step S31, the mobile station 12 receives the system software cyclically transmitted from the base station 2 in step S32. The DSP 17 confirms whether the received system software corresponds to the service specified by the user or not in step S33. Such system software reception and confirmation are repeated until the DSP 17 stores the system software that corresponds to the service specified by the user in the memory 18 in step S34. The DSP 17 executes the system software downloaded into the memory 18 to perform a communication process based on the system software and access the base station 2 via radio communications for performing the communication service desired by the user in step S35.

As described above, the DSP 17 selects the system software corresponding to the service desired by the user from the system software items that are cyclically transmitted from the base station 2 through the broadcast channel, and downloads the selected system software into the memory 18. Therefore, the user can use the desired communication service at the mobile station 12 which is currently used by the user.

The memory 18 also stores a table of information representing communication services and required system software items associated therewith. The DSP 17 refers to the stored table to download the system software designated by the user. If the titles of the communication services stored in the table are displayed on the display unit of the information input/output unit 19, then the user finds it easy to select and designate a desired one of the communication services.

FIGS. 4(a) and 4(b) show a communication processing sequence for supplying system software from the base station 2 to the mobile station 12 based on a time-division multiplex transmission scheme using a broadcast channel in a particular system and a control channel or broadcast channel in the particular system. FIG. 4(a) shows a processing sequence of the base station 2, and FIG. 4(b) shows a processing sequence of the mobile station 12. The communication processing sequence shown in FIGS. 4(a) and 4(b) is applicable to situations where the single base station 2 is compatible with a plurality of systems based on different principles, e.g., communication services such as PHS, PDC, CDMA, etc., and supplies new software to the mobile station present in its service area according to the system to which the mobile station can gain access.

The base station 2 handles a broadcast channel and a control channel or broadcast channel in each of the above systems based on a time-division multiplex transmission scheme. The base station 2 transmits instructive information to the mobile station 12 in a system 1 through a broadcast channel of the system 1 in step S40. After having transmitted the instructive information through the broadcast channel of the system 1 for a given period of time, the base station 2 transmits system software through a control channel or broadcast channel in step S41. If the control channel is used, then the base station 2 transmits the system software to the mobile station 12 in the same manner as the communication processing sequence using a bidirectional control channel as shown in FIGS. 2(a) and 2(b). If the broadcast channel is used, then the base station 2 transmits the system software to the mobile station 12 in the same manner as the communication processing sequence using a unidirectional control channel as shown in FIGS. 3(a) and 3(b).

Subsequently, the systems are successively changed to cyclically transmit instructive information through the broadcast channel and system software in the control channel or the broadcast channel in the time-division multiplex fashion in steps S42–S45.

In response to the instructive information, the mobile station 12 receives the system software transmitted through the control channel or broadcast channel in its own system, and stores the received system software in the memory 18 in step S50. The DSP 17 executes the system software downloaded into the memory 18 to perform a communication process based on the system software and access the base station 2 via radio communications for performing the communication service desired by the user in step S51.

If the control channel is used, then the mobile station 12 downloads the system software from the base station 2 in the same manner as the communication processing sequence using a bidirectional control channel as shown in FIGS. 2(a) and 2(b). If the broadcast channel is used, then the mobile station 12 downloads the system software from the base station 2 in the same manner as the communication processing sequence using a unidirectional control channel as shown in FIGS. 3(a) and 3(b).

FIGS. 5(a) and 5(b) show a communication processing sequence for supplying system software from the base station 2 to the mobile station 12 using a bidirectional control channel and a bidirectional traffic channel for transferring user information. FIG. 5(a) shows a processing sequence of the base station 2, and FIG. 5(b) shows a processing sequence of the mobile station 12. As described in detail later on, a control channel is used to designate a traffic channel to be used to transfer system software, and system software is transmitted through the designated traffic channel via a radio link.

After the base station 2 and the mobile station 12 have established a bidirectional data link using a control channel in steps S60, S70, the base station 2 waits for a service request from the mobile station 12 in step S61. The user operates the information input/output unit 19 to enter a service using request (changing request) in order to change system software, and the DSP 17 transmits the service using request through the data link in step S71. In the base station 2, the service using request is sent to the DSP 8.

In response to the service using request, the DSP 8 selects and designates a traffic channel through which to transmit system software, and transmits information representing the designated traffic channel through the data link in step S62. The base station 2 then waits for a download request from the mobile station 12 in step S63. At this time, the DSP 8 selects and designates an idle one of traffic channels as a traffic channel for transmitting system software that is to be downloaded.

When the mobile station 12 receives the channel designating information, the DSP 17 switches to the designated traffic channel, and displays a prompt to enter a download request on the display unit of the information input/output unit 19 in step S72. When the user enters a download request for a desired communication service via the information input/output unit 19, the DSP 17 transmits the entered download request through the designated traffic channel to the base station 2 in step S73.

In response to the download request, the DSP 8 reads system software designated by the download request from the memory 9, and transmits the system software through the designated traffic channel to the mobile station 12 in step S64. When the base station 2 receives a download completion notice from the mobile station 12, the base station 2 opens the data link and finishes its operation to supply the system software to the mobile station 12 in step S65.

The mobile station 12 receives the system software transmitted from the base station 2 from the traffic channel, and the DSP 17 stores the system software in the memory 18 in step S74. After having sent the download completion notice to the base station 2, the mobile station 12 opens the data link in step S75. The DSP 17 executes the system software downloaded into the memory 18 to perform a communication process based on the system software and access the base station 2 via radio communications for performing the communication service desired by the user in step S76.

Since the system software is supplied through the designated traffic channel, a relatively large volume of system software can be supplied quickly and smoothly from the base station 2 to the mobile station 12. Therefore, the user can use the desired communication service at the mobile station 12 which is currently used by the user.

If information relative to the system software desired by the user is included in the service using request transmitted in step S71, then the transmission of the download request in step S73 can be dispensed with. In this case, upon elapse of a given period of time after the DSP 8 of the base station 2 has transmitted the channel designating information, i.e., upon elapse of a period of time required by the mobile station 12 to complete channel switching, the base station 2 automatically transmits the requested system software through the designated information channel, and the mobile station 12 automatically receives the system software transmitted through the designated information channel and stores the system software in the memory 18.

The radio channels and communications for supplying system software will be described in greater detail below with respect to a PDC (personal digital cellular) system which are presently in use.

Figure 6:
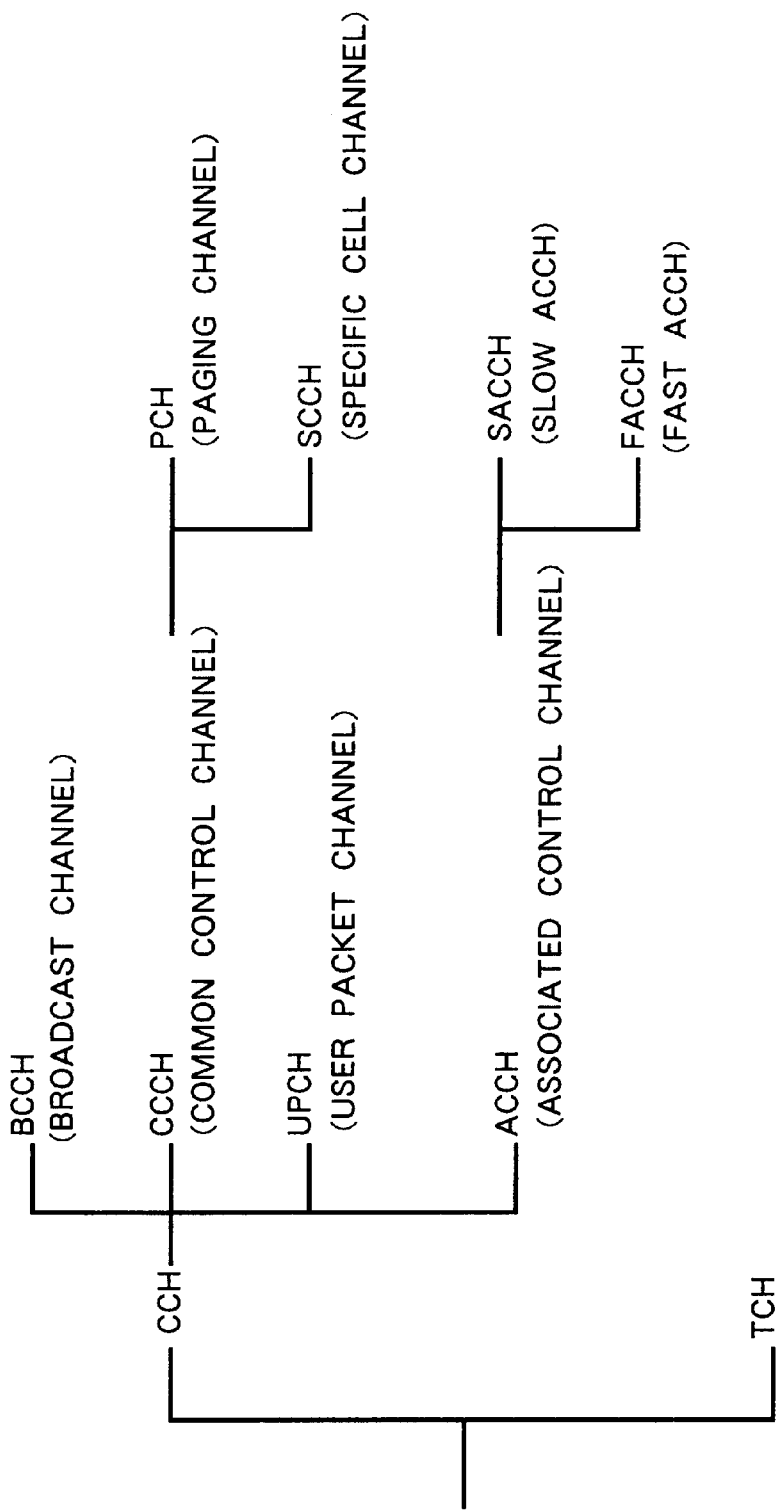
FIG. 6 is a diagram of a hierarchical structure of radio channels in a personal digital cellular system.

The radio channels in the PDC system are arranged in a hierarchical structure as shown in FIG. 6. The radio channels are generally classified into traffic channels (TCH) for primarily transferring user information and control channels (CCH) for primarily transferring control information. The control channels (CCH) include broadcast channels (BCCH), common control channels (CCCH), user packet channels (UPCH), and associated control channels (ACCH). The common control channels (CCCH) include paging channels (PCH) and specific cell channels (SCCH). The associated control channels (ACCH) include slow associated control channels (SACCH) and fast associated control channels (FACCH).

The broadcast channels (BCCH) are unidirectional channels for broadcasting control information from the exchange network 1, i.e., the base station 2, to the mobile station 12, and are mainly used to transfer information for positional registration, information relative to channel structures, information relative to systems, etc.

The common control channels (CCCH) are point-to-multipoint bidirectional channels between the base station 2 and a plurality of mobile stations 12, and are mainly used to transfer signaling information. The common control channels (CCCH) are established such that they and the user packet channels (UPCH) can be shared. The common control channels (CCCH) are also classified into the paging channels (PCH) and specific cell channels (SCCH) for intermittent reception from the mobile stations.

The paging channels (PCH) are unidirectional channels from the exchange network 1, i.e., the base station 2, to the mobile stations 12, and are mainly used to transfer the same information from the exchange network 1 to the mobile stations 12 in a wide area, i.e., a paging area.

The specific cell channels (SCCH) are bidirectional channels between the exchange network 1, i.e., the base station 2, and the mobile stations 12, and are mainly used to transfer independent information for respective cells using different frequency resources if the exchange network 1, i.e., the base station 2, is aware of cells where the mobile stations 12 are present. Upstream channels from the mobile stations 12 to the exchange network 1 are randomly accessible.

The user packet channels (UPCH) are point-to-point bidirectional channels between the base station 2 and the mobile station 12, and are mainly used to transfer user packet data. Upstream channels are randomly accessible.

The associated control channels (ACCH) are point-to-point bidirectional channels between the base station 2 and the mobile station 12, and control channels associated with the traffic channels (TCH), and are mainly used to transfer signaling information and user packet data. For ordinary information and data transfer, the associated control channels (ACCH) operate as slow associated control channels (SACCH). For temporarily stealing traffic channels (TCH) for high-speed data transfer, the associated control channels (ACCH) operate as fast associated control channels (FACCH).

The traffic channels (TCH) are point-to-point bidirectional channels between the base station 2 and the mobile station 12, and are mainly used to transfer user information such audio information, facsimile information, etc. and user information control signals associated therewith.

Channels that are not included in the hierarchical structure are housekeeping channels (RCH) arranged as bits in slots including the traffic channels (TCH). The housekeeping channels (RCH) are used to maintain radio channels.

The above function channels are established so as to be related to control physical channels and communication physical channels as shown in Table 1 below.

Figure 7:
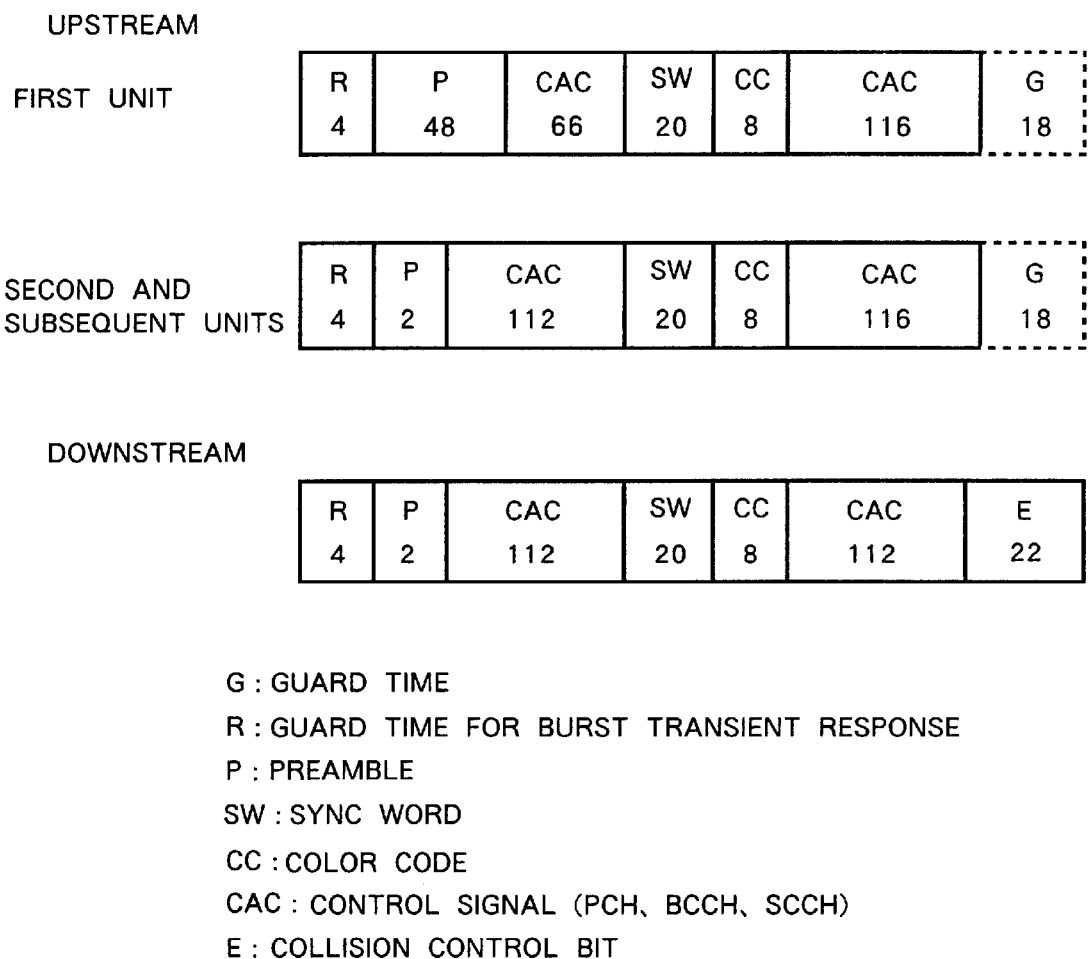
FIG. 7 is a diagram of signal formats in the personal digital cellular system.

The control physical channels have signal formats as shown in FIG. 7. The control physical channels, which are of 280 its, have bits distributed as indicated by numerals in FIG. 7.

TABLE 1

| Physical channels | | Function channels |
|---|---|---|
| Control physical channels | downstream | BCCH, PCH, SCCH, UPCH |
|  | upstream | SCCH, UPCH |
| Communication physical channels | downstream | TCH, SACCH, RCH, FACCH |
|  | upstream | TCH, SACCH, RCH, FACCH |

A procedure for the base station 2 and the mobile station 12 to start communicating with each other in the PDC system with the above channel structure will be described below.

The base station 2 and the mobile station 12 start being connected to each other using a common access channel. The common access channel is shared by a plurality of mobile stations, and comprises a broadcast channel (BCCH), a common control channel (CCCH), and a user packet channel (UPCH). The common access channel is present on an individual carrier (frequency) for each area zone or sector. The common control channel in each zone includes at least one perch channel, and the memory (ROM) 18 of each mobile station stores a frequency used as the perch channel. The frequencies of other control channels are broadcast from the base station 2 through the broadcast channel (BCCH) and stored in the memory (ROM) 18 of each mobile station.

When the mobile station 12 is powered, it scans the carriers of perch channels stored therein for capturing the perch channel of the area zone where the mobile station 12 is present, and generates a table of scan levels. The mobile station 12 is synchronized with a slot 2 successively from carriers of higher levels, confirms a common control channel and receives the broadcast channel (BCCH), and waits for a reception if it is capable of waiting.

Through the above process, the base station 2 and the mobile station 12 are capable of communicating with each other through radio channels for the supply of system software in any of the above modes.

A process of supplying system software in the above modes will be described in greater detail below with respect to the PDC system.

For supplying system software using the control channel described above with reference to FIGS. 2(a) and 2(b), functions in the control channels (CCH) are added for performing communications relative to system software. The communications relative to system software are performed by a radio-frequency transmission management routine that is a layer 3 function. The radio-frequency transmission management routine has functions relative to radio resources including selection of a radio zone, and setting, maintaining, switching, and disconnecting of a radio link.

To perform the above functions, the radio-frequency transmission management routine has a function to transfer messages shown in FIG. 8. Additionally, the radio-frequency transmission management routine has a function to transfer messages representing the transmission of a service using request, the transmission of an available service menu, a download request, and a download.

The service using request is a message by way of which the mobile station 12 transmits to the base station 2 the intention to be supplied with system software, as shown in Table 2 shown below. The service using request is transmitted from the mobile station 12 to the base station 2 using a specific cell channel (SCCH).

TABLE 2

Message type: transmission of service using request  
Direction: mobile station → base station (SCCH)

| Information element | Information length | Remarks |
|---|---|---|
| Message type | 1 | |

The available service menu is a list of system software items that can be supplied at present from the base station 2 to the mobile station 12 using a slow associated control channel (SACCH) or a fast associated control channel (FACCH), if the base station 2 confirms that the mobile station 12 has an intention to be supplied with system software, as shown in Table 3 below.

TABLE 3

Message type: transmission of available service menu  
Direction: base station → mobile station (SACCH/FACCH)

| Information element | Information length | Remarks |
|---|---|---|
| Message type | 1 | |
| Available services | 1 - N | List of services |

The download request is a message for requesting the transmission of system software desired by the user, as shown in Table 4 below. The download request is transmitted from the mobile station 12 to the base station 2 using a slow associated control channel (SACCH).

TABLE 4

Message type: download request  
Direction: mobile station → base station (SACCH)

| Information element | Information length | Remarks |
|---|---|---|
| Message type | 1 | |
| Requested system software | 1 | |

The download is a message including system software requested by the mobile station 12 as shown in Table 5 below, and is transmitted from the base station 2 to the mobile station 12 using a slow associated control channel (SACCH) or a fast associated control channel (FACCH).

TABLE 5

Message type: download  
Direction: base station → mobile station (SACCH/FACCH)

| Information element | Information length | Remarks |
|---|---|---|
| Message type | 1 | |
| System software | N | |

As described above, the messages are transmitted using control channels. Specifically, in response to a service using request (menu request) from the mobile station 12, the base station 2 transmits an available service menu, representing a list of system software items that can be supplied from the base station 2, to the mobile station 12, which selects system software that the user wants to use from the available service menu and transmits a download request to the base station 2, which transmits the requested system software to the mobile station 12. In this manner, the system software desired by the mobile station 12 is supplied to and downloaded into the mobile station 12, and then executed by the digital signal processor (DSP) to change communication principles of the mobile station 12.

If a traffic channel (TCH) is designated using a control channel and system software is supplied via the traffic channel (TCH), as described above with reference to FIGS. 5(*a*) and 5(*b*), then a function to transmit a service using request and designate a download channel as shown in FIG. 10 for carrying out communications relative to system software, rather than the message function shown in FIG. 9, is added to the radio-frequency transmission management routine.

The service using request (changing request), which is the same as the service using request as shown in Table 2, is a message by way of which the mobile station 12 transmits to the base station 2 the intention to be supplied with system software. The service using request is transmitted from the mobile station 12 to the base station 2 using a specific cell channel (SCCH).

The designation of a download channel is a message of designating information which designates a traffic channel (TCH) for transmitting system software in response to a service using request (changing request) from the mobile station 12, as shown in Table 6 below. The designation of a download channel is transmitted from the base station 2 to the requesting mobile station 12 using a slow associated control channel (SACCH).

TABLE 6

Message type: designation of downloading traffic channel  
Direction: base station → mobile station (SACCH)

| Information element | Information length | Remarks |
|---|---|---|
| Message type | 1 | |
| Frequency code | 2 | |
| Slot number | 1 | |
| Color code | 1 | |
| Scramble code | 1 | |
| Mobile station transmission power designation | 1 | |
| Channel information | 1 | |

As described above, the messages are transmitted using control channels. Specifically, in response to a service using request (changing request) from the mobile station 12, the base station 2 transmits designating information relative to a traffic channel (TCH) to the mobile station 12, which switches to the designated information channel according to the designating information. Using the designated information channel, system software is transmitted from the base station 2 to the mobile station 12 and downloaded into the mobile station 12. The downloaded system software is executed by the digital signal processor (DSP) to change communication principles of the mobile station 12. If a plurality of system software items held by the base station 2 are cyclically transmitted via the traffic channel, and the mobile station 12 downloads a desired one of the system software items, or if a service using request (changing request) which contains the designation of system software is transmitted from the mobile station 12 to the base station 2, and the base station 2 transmitted the designated system software to the mobile station 12, then the mobile station 12 can download the desired system software.

As described above with reference to FIGS. 3(*a*) and 3(*b*), the base station 2 cyclically transmits a plurality of system software items through a broadcast channel (BCCH), and the mobile station 12 downloads a desired one of the system software items. At this time, an extended information element having an information length K for including system software is added to information messages broadcast via the broadcast channel (BCCH), as shown in Table 7 below.

The broadcast channel (BCCH) is a unidirectional channel for broadcasting information relative to the structure of a control channel, information relative to the determination of a waiting channel, limiting information, etc. from the base station 2 to the mobile station 12. With system software stored in the extended information element, the base station 2 can cyclically transmit a plurality of system software items to the mobile station 12, which downloads a desired one of the system software items, and the downloaded system software can be executed by the digital signal processor (DSP) to change communication principles of the mobile station 12.

TABLE 7

| Information element | Information length | Remarks |
|---|---|---|
| Message type | 1 | |
| Network number | 2 | |
| Limiting information | 3 | |
| Control channel structure information | 6–33 | |
| Mobile station transmission power designation | 1 | |
| Waiting permission level | 1 | |
| Waiting degradation level | 1 | |
| Number of multiplexed position registration areas | 1 | 1, 2, 8, 8, OR 16 |
| Position number | 1 | 1st - Nth |
| Maximum number of broadcast channels | 1 | 0 - M |
| Number of perch channels for determining zone/sector in which mobile station is located | 1 | 0–20 |
| Perch channel number | 1 | 1st - Nth |
| Position registration timer | 1 | |
| Extended information element length | 1 | 0–127 |
| (Extended information element) | K | |

Figure 11:
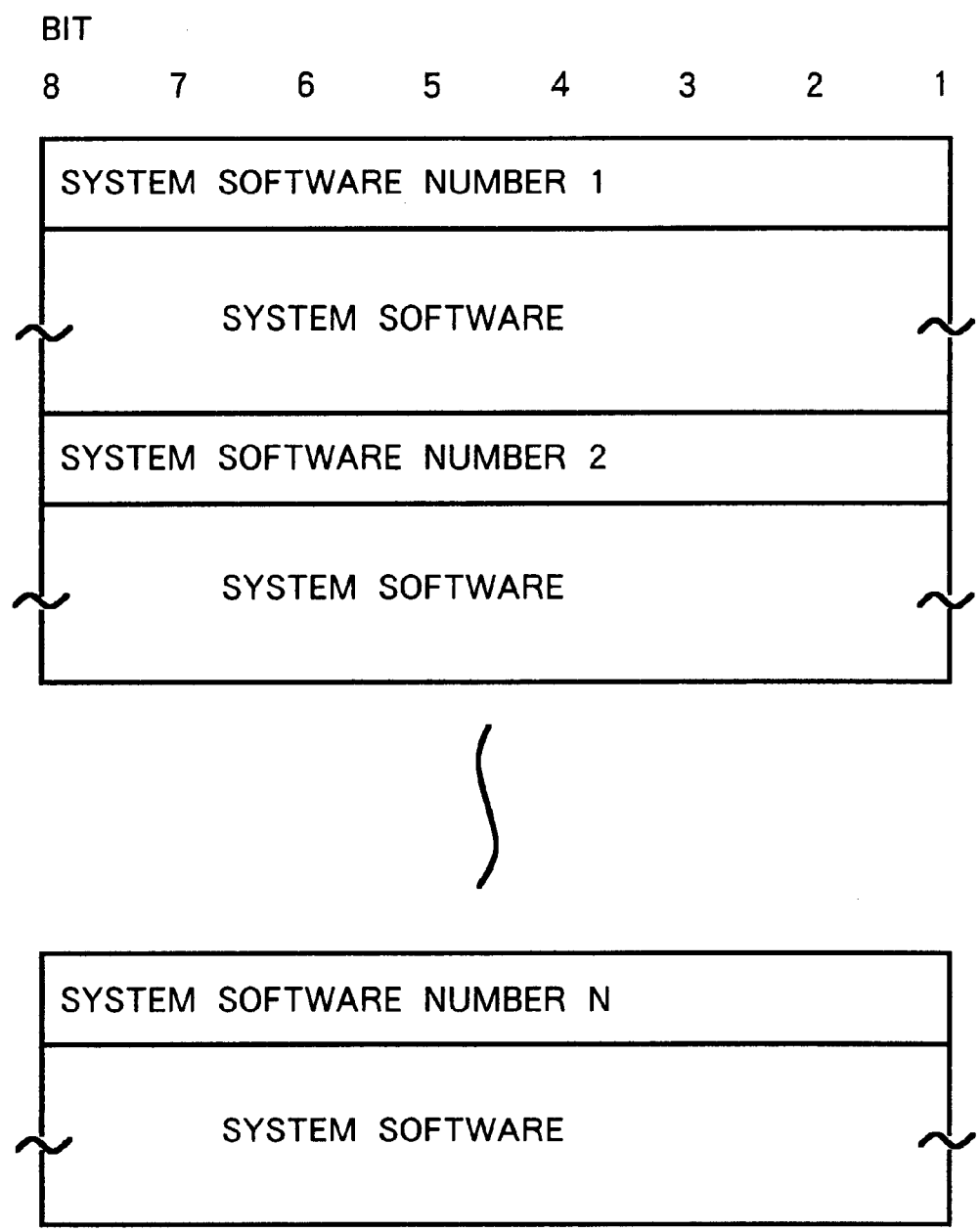
FIG. 11 is a diagram illustrating the transmission of system software via a broadcasting channel.

As shown in FIG. 11, a number is added as an identifier to each system software, providing an extended information element, and the extended information element is transmitted using a broadcast channel (BCCH) via a radio link to the mobile station 12. In the mobile station 12, the user selects a desired service, and downloads system software corresponding to the service from a plurality of cyclically transmitted system software items into the memory 18.

If one system software item cannot be fully accommodated in one extended information element due to the relationship between the extended information element and the information length of each system software item, then the system software item may be divided and accommodated in a plurality of extended information elements and then transmitted. If the information length of system software is small, then a plurality of system software items may be accommodated in one extended information element and then transmitted.

As described above, system software can be transmitted via a radio link to change communication principles simply by slightly modifying the control channels of the existing PDC system. Furthermore, system software can be downloaded via radio communications in various mobile communication systems such as the existing PHS system by slightly modifying the mobile communication systems.

In the above embodiment, a DSP is illustrated as a hardware resource for executing system software (control program). However, the present invention may be implemented by various processors such as general CPUs or the like regardless of their processing schemes.

In the above embodiment, many functions of the base station 2 and the mobile station 12 are performed by processors. However, since the present invention resides in that communication principles realized by the processor (control means) are changed by changing system software, general-purpose functions, such as storage control or the like, not related to the communication principles may be performed by a hardware circuit, rather than the processor.

The base station 2 and the mobile station 12 may store a plurality of system software items in the memories 9, 18, and the stored system software items may be selected to adapt themselves to a plurality of communication principles. Changing communication principles as expressed herein is not limited to changing communication principles so as to be able to perform only communication principles with supplied system software, but also covers changing communication principles according to supplied system software in addition to existing communication principles.

According to the present invention, as described above, since communication principles of a mobile communication unit can easily be changed by way of radio communications, the user can receive desired communication services with a single mobile communication unit, without carrying a plurality of mobile communication units and involving an increase in the size and cost of the mobile communication unit, in order to receive various communication services and overseas communication services. Furthermore, inasmuch as communication principles of the base station can easily be changed by way of communications, the communication principles of a great number of base stations can each easily be changed without involving an increase in the size and cost of base station facilities, for thereby achieving a system modification.

Because communication principles are changed by transmitting and downloading various system software items into hardware resources as a platform, communication systems can flexibly be changed simply by changing system software to meet technological advances and changing needs.

Although a certain preferred embodiment of the present invention has been shown and described in detail, it should be understood that various changes and modifications may be made therein without departing from the scope of the appended claims.

What is claimed is:

1. A mobile communication unit capable of changing communication processing details with a control program received from an external unit via a radio link, wherein said external unit successively and repeatedly transmits a plurality of control programs via a radio link, said mobile communication unit comprising:

radio communication means for receiving the plurality of control programs via the radio link;

a memory;

input means for receiving a control input from a user for use in selecting one of the control programs among the plurality of control programs received by said radio communication means;

memory control means for selecting said one of the control pro grams among the plurality of control programs based on the control input received by said input means, and for controlling said memory to store said one of the control programs, wherein said memory is operable to store said one of the control programs; and control means for performing communication processing according to said one of the control programs that is stored in said memory.

2. A mobile communication unit according to claim 1, as a mobile communication unit terminal for transmitting information to and receiving information from a base station via a radio link, wherein said control means comprises means for executing said one of the control programs received from the base station and stored in said memory to change communication processing of said mobile communication unit according to said one of the control programs.

3. A mobile communication unit according to claim 2, wherein said base station receives a control program transmitted from a center through a public exchange network, and said control means comprises means for executing the control program received from the base station and stored in said memory to change communication processing of said mobile communication unit according to the control program.

4. A mobile communication system including:

a base station comprising radio communication means for transmitting system software via a radio link, and system software supply means for successively and repeatedly transmitting a plurality of system software items from said radio communication means via the radio link; and a mobile communication unit comprising radio communication means for receiving the plurality of system software items from said base station via the radio link, a memory, input means for receiving a control input from a user of said mobile communication unit for use in selecting one of the system software items among the plurality of system software items received by said radio communication means of said mobile communication unit, memory control means for selecting said one of the system software items among the plurality of system software items based on the control input received by said input means, and for controlling the memory to store said one of the system software items, wherein said memory is operable to store said one of the system software items, and control means for performing communication processing according to said one of the system software items that is stored in said memory, whereby communication processing can be performed by said one of the system software items.

5. A mobile communication system according to claim 4, wherein a unidirectional broadcast channel from said base station to said mobile communication unit, together with a traffic channel for transferring user information, is used between said base station and said mobile communication unit for transmitting the plurality of system software items via the radio link.

6. A mobile communication system according to claim 5, wherein broadcast channels corresponding to a plurality of communication systems of different communication principles are provided in a time-division multiplexed fashion between said base station and said mobile communication unit to allow said base station to communicate with a plurality of mobile communication units of different communication principles, whereby system software can be transmitted from said base station to one of said plurality of mobile communication units via a broadcast channel which corresponds to said one of said plurality of mobile communication units.

7. A mobile communication system comprising a base station and a mobile communication unit, said mobile communication unit being operable to transmit information between said base station and said mobile communication unit via a radio link, wherein said base station and said mobile communication unit communicate with each other via the radio link using a traffic channel for transferring user information and a control channel provided together with the traffic channel, and wherein:

said base station comprises radio communication means for transmitting a system software item via the radio link;

said mobile communication unit comprises radio communication means for receiving the system software item from said base station via the radio link, a memory operable to store the system software item received by said radio communication means of said mobile communication unit, control means for performing communication processing according to the system software stored item in said memory, input means for receiving a control input from a user of said mobile communication unit for use in generating a request to change the system software item received by said radio communication means of said mobile communication unit, and change requesting means for transmitting, from said radio communication means of said mobile communication unit via the radio link using the control channel to said radio communication means of said base station, the request to change the system software item based on the control input received by said input means;

said base station further comprises channel selecting means for selecting and designating the traffic channel for transferring user information to transmit system software corresponding to the request to change the system software item received by said radio communication means of said base station, channel designating means for transmitting, from said radio communication means of said base station via the radio link using the control channel, designating information of the traffic channel designated by said channel selecting means, and system software supply means for successively and repeatedly transmitting, from said radio communication means of said base station via the radio link using the traffic channel designated by the transmitted designating information, a plurality of system software items including a new system software item corresponding to the request to change the system software item; and said mobile communication unit further comprises memory control means for selecting the new system software item among the plurality of system software items, which is received by said radio communication means of said mobile communication unit by using the traffic channel designated by the designating information received by said radio communication means of said mobile communication unit, and for controlling said memory to store the new system software item.

8. A mobile communication system according to claim 7, wherein control channels corresponding to a plurality of communication systems of different communication principles are provided in a time-division multiplexed fashion between said base station and said mobile communication unit to allow said base station to communicate with a plurality of mobile communication units of different communication principles, whereby system software can be transmitted from said base station to one of said plurality of mobile communication units via a control channel which corresponds to said one of said plurality of mobile communication units.

9. A method of changing communication principles of a mobile communication system for transmitting information between a base station and a mobile communication unit via a radio link, said method comprising:

successively and repeatedly transmitting a plurality of system software items from said base station to said mobile communication unit via the radio link;

receiving a control input from a user of said mobile communication unit for selecting one of the system software items among the plurality of system software items transmitted from said base station to said mobile communication unit;

controlling a memory of said mobile communication unit to select and receive, from said base station via the radio link, said one of the system software items among the plurality of system software items based on the control input received from the user of said mobile communication unit, and to store said one of the system software items; and performing communication processing according to said one of the system software items among the plurality of system software items which said mobile communication unit has received via the radio link.

10. A mobile communication unit of a communication system wherein a base station is configured and operable to successively and repeatedly transmit, via a transmitter/receiver, a plurality of control programs, said mobile communication unit comprising:

a radio transmitter/receiver operable to receive the plurality of control programs via the radio link;

a memory;

an input unit to be operated by a user to input a control input for use in selecting one of the control programs among the plurality of control programs received by said radio transmitter/receiver; and a controller configured and operable to select said one of the control programs among the plurality of control programs based on the control input, to store, in said memory, said one of the control programs, wherein said memory is operable to store said one of the control programs, and to perform communication processing according to said one of the control programs that is stored in said memory.

11. A mobile communication unit according to claim 10, further comprising an antenna connected to said radio transmitter/receiver.

12. A mobile communication unit according to claim 10, further comprising:

an analog to digital converter connected between said radio transmitter/receiver and said controller; and a digital to analog converter connected between said controller and said radio transmitter/receiver.

13. A mobile communication unit according to claim 10, further comprising an information input/output unit connected to said controller.

14. A mobile communication unit according to claim 11, wherein said controller is operable to change the communication processing to a communication process determined based on contents of said one of the control programs.

15. A communication system comprising:

a base station comprising a radio transmitter/receiver operable to transmit system software over a radio link, and a controller configured and operable to successively and repeatedly transmit a plurality of system software items via said radio transmitter/receiver; and a mobile communication unit comprising
a radio transmitter/receiver operable to receive, via the radio link, the plurality of system software items transmitted from said base station,
a memory,
an input unit to be operated by a user to input a control input for use in selecting one of the system software items among the plurality of system software items received by said radio transmitter/receiver of said mobile communication unit, and
a controller configured and operable to select said one of the system software items among the plurality of system software items based on the control input, to store, in said memory, said one of the system software items, wherein said memory is operable to store said one of the system software items, and to perform communication processing according to said one of the system software items that is stored in said memory.

16. A communication system according to claim 15, wherein said base station and said mobile communication unit utilize a unidirectional broadcast channel, together with a traffic channel for transferring user information, to communicate the plurality of system software items via the radio link.

17. A communication system according to claim 16, wherein said base station and said mobile communication unit utilize broadcast channels corresponding to a plurality of communication systems of different communication principles, respectively, in a time-division multiplexing operation to allow said base station to communicate with a plurality of mobile communication units that utilize different communication principles, respectively.

18. A communication system comprising a base station and a mobile communication unit, wherein said base station and said mobile communication unit communicate with each other via a radio link using a traffic channel for transferring user information and a control channel provided together with the traffic channel, and wherein:

said base station comprises a radio transmitter/receiver operable to transmit a system software item over the radio link; and said mobile communication unit comprises
a radio transmitter/receiver operable to receive the system software item from said base station via the radio link,
a memory operable to store the system software item received by said radio transmitter/receiver of said mobile communication unit, an input unit to be operated by a user to input a control input for use in generating a request to change the system software item received by said radio transmitter/receiver of said mobile communication unit, and a controller configured and operable to perform communication processing according to the system software item stored in said memory, and to transmit, via said radio transmitter/receiver of said mobile communication unit over the control channel, the request to change the system software item based on the control input;

said radio transmitter/receiver of said base station is operable to receive the request to change the system software item;

said base station further comprises a controller configured and operable to select and designate the traffic channel to transmit new system software based on the request to change the system software item received by said radio transmitter/receiver of said base station, transmit, via said radio transmitter/receiver of said base station over the control channel, designating information of the traffic channel, and successively and repeatedly transmit, via the traffic channel designated by the designating information, a plurality of system software items including a new system software item corresponding to the request to change the system software item based on the control input;

said radio transmitter/receiver of said mobile communication unit is operable to receive, via the traffic channel, the plurality of system software items including the new system software item corresponding to the request to change the system software item based on the control input; and and said controller of said mobile communication unit is operable to select the new system software item among the plurality of system software items corresponding to the request to change the system software based on the control input, and to control said memory of said mobile communication unit to store the new system software item.

19. A communication system according to claim 18, wherein said base station and said mobile communication unit utilize control channels corresponding to a plurality of communication systems of different communication principles, respectively, in a time-division multiplexing operation to allow said base station to communicate with a plurality of mobile communication units that utilize different communication principles, respectively.

* * * * *